United States Patent [19]

Reiner et al.

[11] Patent Number: 5,337,211
[45] Date of Patent: Aug. 9, 1994

[54] ELECTRICAL LOAD CENTER INTERIOR PANEL HAVING MOLDED INSULATING SUPPORT PANEL WITH SNAP-IN BUS BARS

[75] Inventors: Richard A. Reiner, Colgate; David L. Vogel, Wauwatosa, both of Wis.

[73] Assignee: Eaton Corporation, Cleveland, Ohio

[21] Appl. No.: 76,056

[22] Filed: Jun. 14, 1993

[51] Int. Cl.⁵ .............................. H02B 1/04
[52] U.S. Cl. ................... 361/637; 361/650; 439/574
[58] Field of Search ........... 248/27.1; 200/296; 439/460, 571–574; 174/70 B, 71 B, 72 B, 99 B, 149 B; 361/627, 634, 635, 637, 639, 644, 648–650

[56] References Cited

U.S. PATENT DOCUMENTS

| | | | |
|---|---|---|---|
| 3,787,712 | 1/1974 | Diersing | 317/119 |
| 3,858,092 | 12/1974 | Olashaw | 317/120 |
| 4,646,198 | 2/1987 | Rich | 361/346 |
| 4,916,574 | 4/1990 | Hancock | 361/361 |
| 5,134,543 | 7/1992 | Sharp et al. | 361/358 |
| 5,181,165 | 1/1993 | Gehrs et al. | 361/355 |

Primary Examiner—Gerald P. Tolin
Attorney, Agent, or Firm—Larry G. Vande Zande

[57] ABSTRACT

A plastic panel has a central row of openings, each having a forwardly facing shelf at one end, a plurality of rearwardly directed posts having forwardly facing shoulders, a plurality of projections proximate the respective openings, each projection having a forward facing shoulder a plurality of resilient latches integrally molded in the panel, and lateral sidewalls extending rearwardly well beyond a main body portion of the panel, the sidewalls being parallel to the row of openings. A bus bar selected from two different width bus bars has a plurality of holes to be disposed over the posts and a plurality of branch circuit fingers extending transversely to the bus bar. Attachment of the bus bar to the panel is accomplished by pressing the bus bar over the posts against the latches to depress the latches and subsequently sliding the bus bar toward the row of openings to engage the distal ends of the branch circuit fingers with the shelves, the leading edge of the bus bar with the forwardly facing shoulders of the projections and edges of the holes with the forwardly facing shoulders of the posts, and to release the latches to engage an edge of the bus bar to retain the bus bar in engagement with the aforementioned shoulders and shelves.

13 Claims, 4 Drawing Sheets

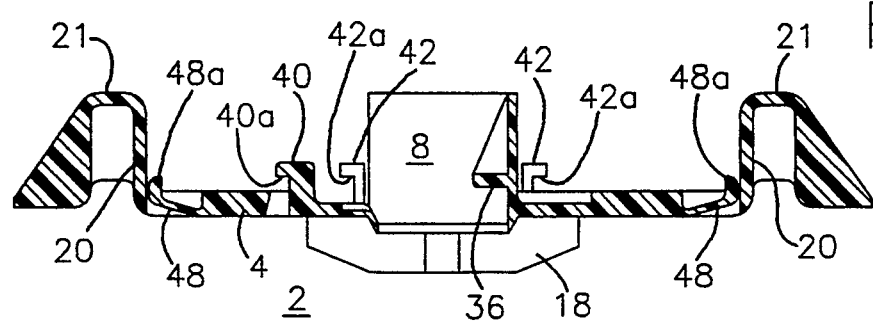
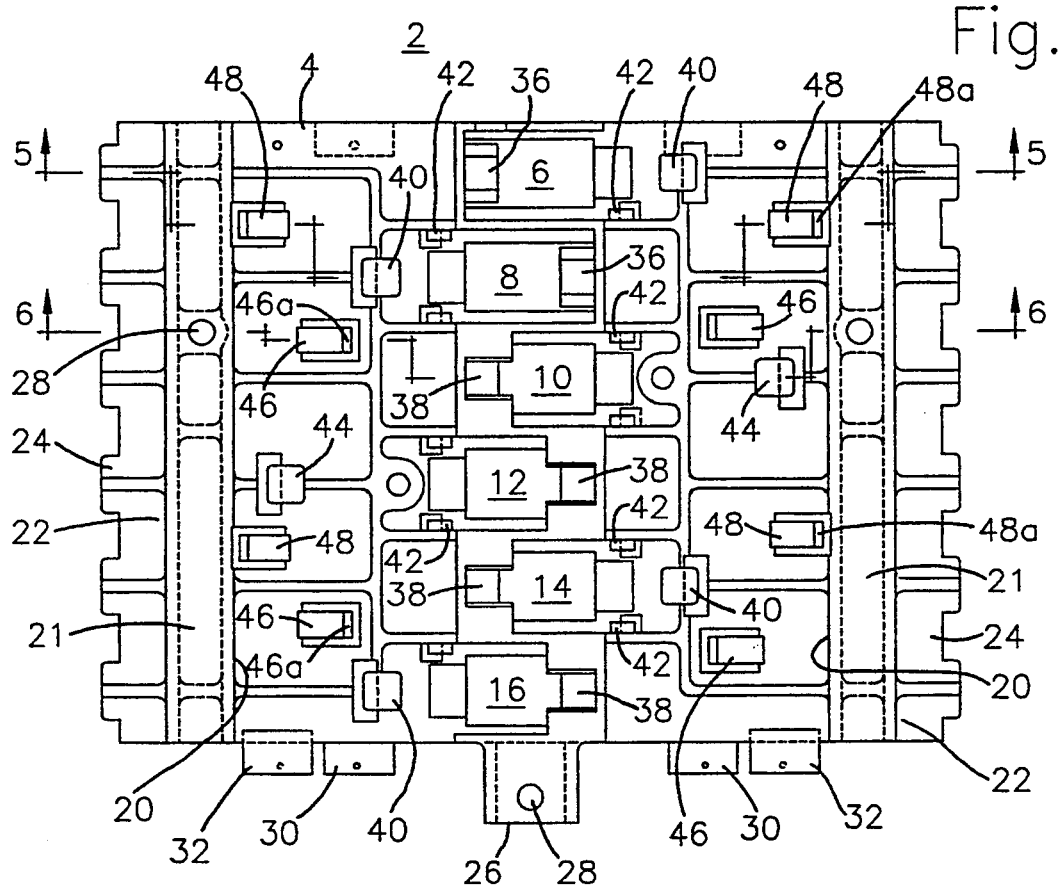
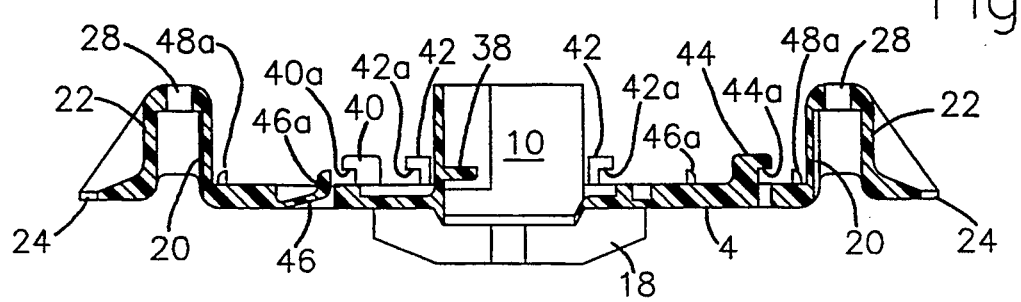

ELECTRICAL LOAD CENTER INTERIOR PANEL HAVING MOLDED INSULATING SUPPORT PANEL WITH SNAP-IN BUS BARS

BACKGROUND OF THE INVENTION

This invention relates to electrical distribution panelboards, particularly those for use in residential and light industrial applications known as load centers.

Electrical distribution load centers comprise a wall mounted box enclosure. Within the enclosure is mounted an interior panel which supports conductive bus bars and electric circuit breakers attached to the interior and to the bus bars. A dead front cover is disposed over the box with openings for the circuit breaker handles to project through and a door is hinged to the enclosure over the dead front to conceal the circuit breaker handles. A goal in load center design is to reduce the cost of the load center. A common approach has been to reduce the number of fasteners or to eliminate fasteners entirely, thereby reducing labor steps required for assembly.

U.S. Pat. No. 5,181,165 issued Jan. 19, 1993 to D. F. Gehrs et al discloses an insulating support having slots in lateral edges into which bus bars are inserted from the opposite edges toward a center of the support. Interfitting retention means are provided on the bus bars and the support to function as detents for retaining the bus bars assembled to the support. The support is also provided with a plurality of integrally molded pins projecting from a back side of the support which extend through holes in a fiber insulator board and in a sheet metal pan of the interior panel. The pins are ultrasonically staked at the back side of the pan to retain the support and bus bars permanently assembled to the sheet metal pan. This approach eliminates separate fasteners such as screws or rivets, but still requires a separate fastening operation ultrasonically staking the pins on the back side of the pan.

U.S. Pat. No. 5,134,543 issued Jul. 28, 1992 to J. O. Sharp et al discloses an electrical load center wherein the interior panel comprises a molded insulating support panel for the bus bars which also has mechanical attachment means for the circuit breakers incorporated in the molding. Accordingly, the molded insulating support of Sharp et al incorporates the features of the separate metal pan to reduce the number of individual parts. The bus bars are attached to the back side of the molded insulating support by inserting one end in a molded pocket and pivoting the other end into engagement with a resilient snap hook integrally molded in the support. The patent also discloses several short supporting walls arranged on opposite sides of the bus bar in the support panel which are ultrasonically staked over the bus bars to retain the bus bars in place as an alternate or a conjunctive construction to the snap-in mounting of the bus bars. The structure for mechanically attaching the circuit breakers to this support panel comprises parallel rows of double apertures in the front face of the support panel and depending fingers at the back side of the support panel adjacent each of the apertures for receiving two pairs of contact jaw shrouds depending from the molded case of the electric circuit breaker. Only one of the pairs of jaw shrouds has electric contact jaws therein for engaging the respective bus bar. The other pair of jaw shrouds serves solely as a mechanical attachment of the opposite end of the circuit breaker to the support panel. This support panel design requires a wholly new design housing for the circuit breaker to incorporate the two pairs of jaw shrouds which are not usually found on residential and light industrial circuit breakers.

While the above described examples of insulating support panels for load centers are satisfactory for their intended purpose, this invention relates to improvements thereover.

SUMMARY OF THE INVENTION

The invention provides an interior panel for a load center comprising a molded insulating support panel to which electrically conductive bus bars are attached at the back side by positioning the respective bus bar against the support panel, sliding the bus bar into engagement with retention structure on the panel, and engaging the bus bar with a resilient latch to retain it in that position. A plurality of holes in the main portion of the bus bar are disposed over rearwardly projecting posts on the back side of the support panel, the posts having front-facing shoulders engaged by an edge of the respective holes when the bus bar is slid into position to provide rearward support for the bus bar. The back side of the support panel provides forward support for the bus bar. Additional rearward extending projections engage the leading edge of the bus bar when it is slid into position to provide additional rearward support. Still further rearward support is provided by shelves within openings in the support panel for receiving distal ends of branch circuit connectors of the bus bar. Resilient latches are integrally molded in the support panel at two different distances from the openings for the branch circuit connectors to accommodate two different widths of bus bar for different electrical ratings of the load center. The molded support panel may be attached to a separate pan, but preferably has circuit breaker mounting rails integrally molded thereon to provide a one-piece interior panel.

BRIEF DESCRIPTION OF THE DRAWINGS

FIG. 4 is a rear plan view of the support panel shown in FIG. 1;

FIG. 5 is a transverse cross sectional view of the support panel of this invention taken along the line 5—5 in FIG. 4;

FIG. 6 is a transverse cross sectional view of the support panel taken along the line 6—6 in FIG. 4;

DETAILED DESCRIPTION OF THE PREFERRED EMBODIMENT

Figure 2:
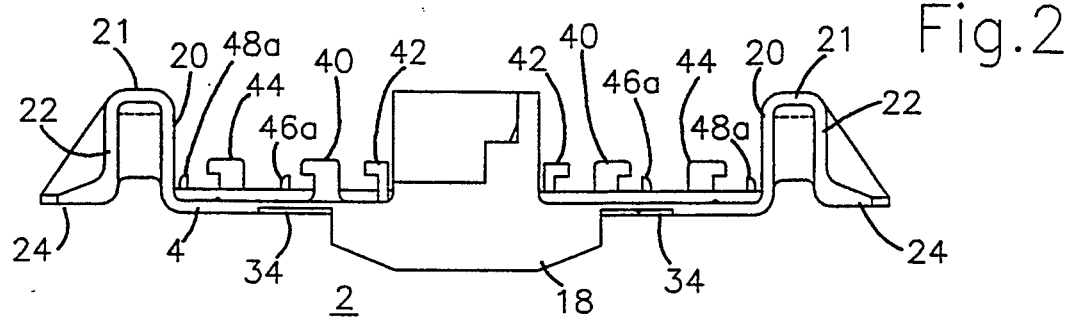
FIG. 2 is an end elevational view of the upper end of the support panel as shown in FIG. 1.
Figure 1:
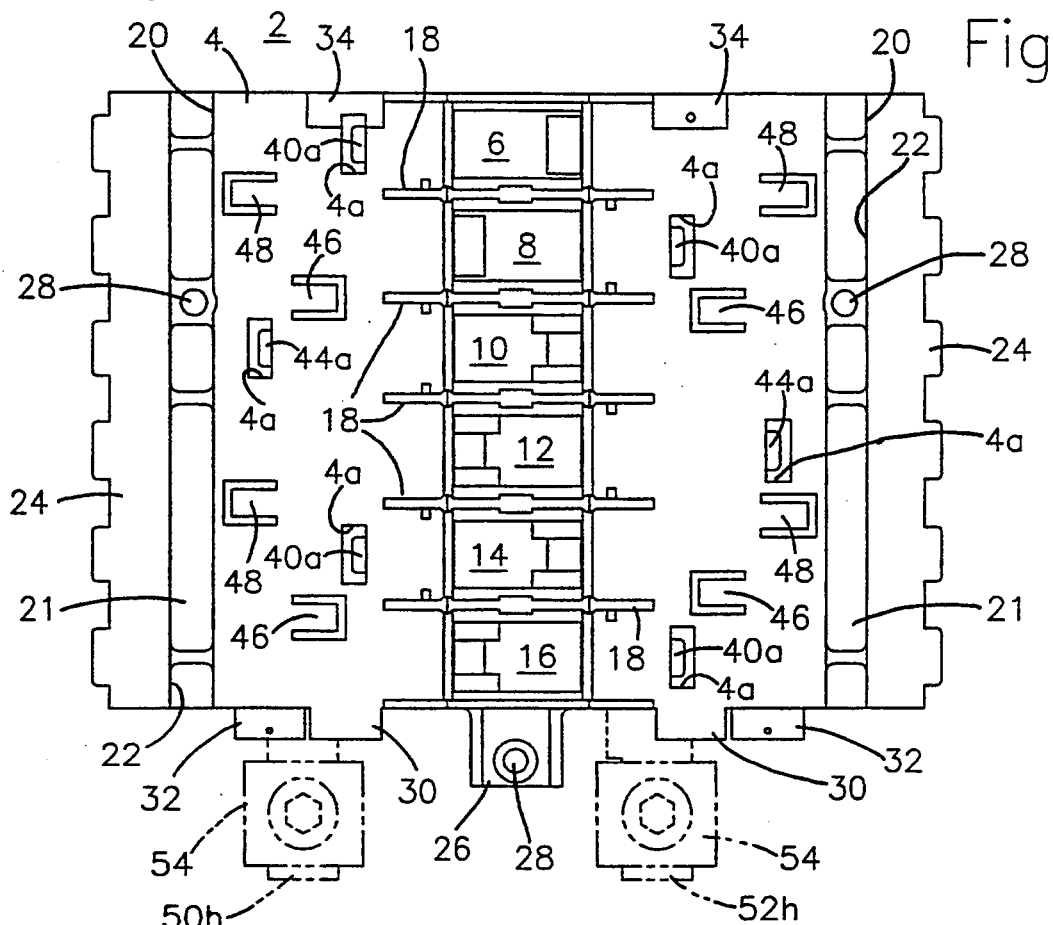
FIG. 1 is a front plan view of a molded insulating support panel for an electrical load center interior panel constructed in accordance with this invention.
Figure 3:
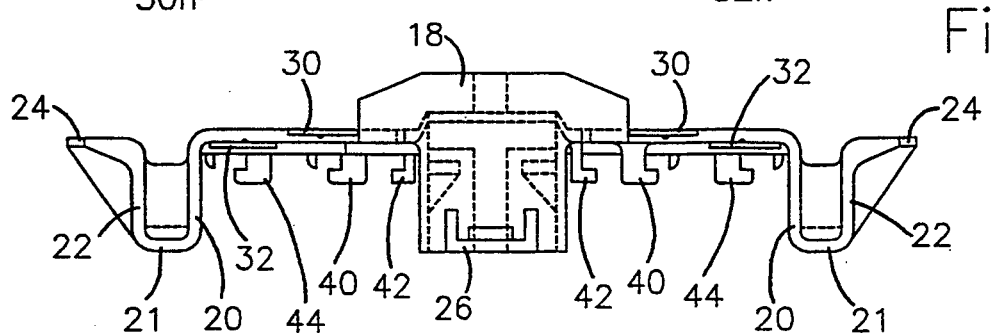
FIG. 3 is an end elevational view of the lower end of the support panel as shown in FIG. 1.

Referring to the drawings, a molded insulating support panel 2 comprises a substantially planar main body portion 4 having a front side as shown in FIG. 1 and a back side as shown in FIG. 4. A plurality of spaced openings 6, 8, 10, 12, 14 and 16 are provided through the main body portion 4 communicating between the front side and back side of the support panel 2. The openings 6–16 are arranged in a vertically extending row at the center of the support panel as viewed in FIGS. 1 and 4. Upstanding barriers 18 are molded to the front side of main body 4 between adjacent ones of the openings 6–16. Main body portion 4 includes rearwardly directed side walls 20 at the opposite lateral edges thereof. Forwardly extending side walls 22 are joined to respective side walls 20 by rear web portions 21, the side walls 22 having an outwardly directed flange 24 at the forward ends thereof to provide mounting rails for mechanical attachment of electrical circuit breakers to the support panel 2. A mounting foot 26 depends from the lower end of support panel 2 as viewed in FIG. 1. Mounting foot 26 and the rear webs 21 between side walls 20 and 22 are provided with mounting holes 28 for mounting the support panel either to a separate metal pan or to the rear wall of an enclosure for the load center. The lower end of main body portion 4 is provided with two pairs of depending tabs 30 and 32. As seen in FIG. 3, tabs 30 are flush with the front surface of main body portion 4 while tabs 32 extend from the back of the rear surface of main body portion 4. Tabs 30 have a small semispherical boss molded on the back side thereof and tabs 32 have a similar semispherical boss molded on the front side thereof. The upper end of main body portion 4 has a pair of shallow rectangular recesses 34 which are complemental to tabs 30. Right-hand recesses 34 as viewed in FIG. 1, has a semispherical indentation molded therein. A hole 4a, to be described more fully hereinafter, extends into the left-hand recess 34, as viewed in FIG. 1, into an area thereof where a semispherical recess would be located. As may be seen in FIG. 4, the back side surface of main body portion 4 has small semispherical indentations molded therein at the upper end in corresponding alignment with the boss of a corresponding tab 32. Tabs 30 and 32 and recess 34 provide an interlocking arrangement for joining two support panels 2 together end-to-end wherein the tabs 30 enter the recesses 34 and the tabs 32 slide behind the back surface of main body 4 with the respective semispherical bosses and recesses engaging to provide a detent for retaining the support panels assembled together.

Referring to FIG. 4, the back side of the support panel 2 is shown. Bus bar supporting and mounting structure are provided on the back side of the support panel 2 on either side of the centrally disposed row of openings 6–16. The structures are substantially the same on either side of the openings except that the structures on one side are displaced vertically one opening from the structures on the other side to allow for interleaving of branch circuit connector fingers of the bus bars from opposite sides. Such interleaving is a well known expedient and will not be dealt with in depth herein. One element of the support structure is a shelf 36 or 38 disposed at one end or the other of the respective openings 6–16. FIG. 5 shows the structure of a shelf 36 and FIG. 6 shows the structure of a shelf 38. The two structures are essentially the same except that shelf 36 has a pair of triangular supporting webs extending from the back of the shelf at the sides thereof, and shelf 38 has a pair of wide rectangular side plates extending beyond the forward surface of the shelf, narrowing the area of the shelf as may be seen in the drawings. Another element of the support structure is a first pair of rearwardly extending projections 40 on either side of the row of openings 6–16. The projections 40 are essentially square in cross section at the distal end, but are relieved along the length thereof to provide a forward-facing shoulder 40a near the distal end. The previously mentioned openings 4a in the main body 4 of support panel 2 are created by a pin insert in the mid to form the surface 40a. A second plurality of rearwardly extending projections 42 are provided adjacent upper and lower sides of the openings 6–16. Projections 42 also have a forward-facing shoulder 42a near the distal ends thereof and an adjacent opening through the main body portion 4 created by a pin insert in the mold to provide the shoulder 42a. Another rearwardly directed projection 44 is provided on either side of the row of openings 6–16, the projection 44 being identical to projections 40. Projection 44 is spaced transversely from the row of openings 6–16 a greater distance than are the projections 40 to accommodate a wider bus bar as will be explained more fully hereinafter. The final structure for mounting and retaining the bus bars to the support panel 2 are pairs of latches 46 and 48. Each of the latches 46 and 48 are cantilever portions formed by a U-shaped slot molded in the main body portion 4 of support panel 2. Latches 46 have their distal ends directed toward the row of openings 6–16, whereas latches 48 are disposed at a greater transverse distance from the row of openings 6–16 and have their distal ends disposed away from the row of openings. As may be seen in FIGS. 5 and 6, the latches 46 and 48 comprise a rearwardly directly foot portion 46a, 48a, respectively, at the respective distal ends. Latches 46 and 48 are molded to project rearwardly at a shallow angle and to have a reduced thickness relative to main body portion 4 to enable the latches to be deflected or depressed by a force directed on the foot portions 46a, 48a from the back side of the support panel 2.

Figure 7:
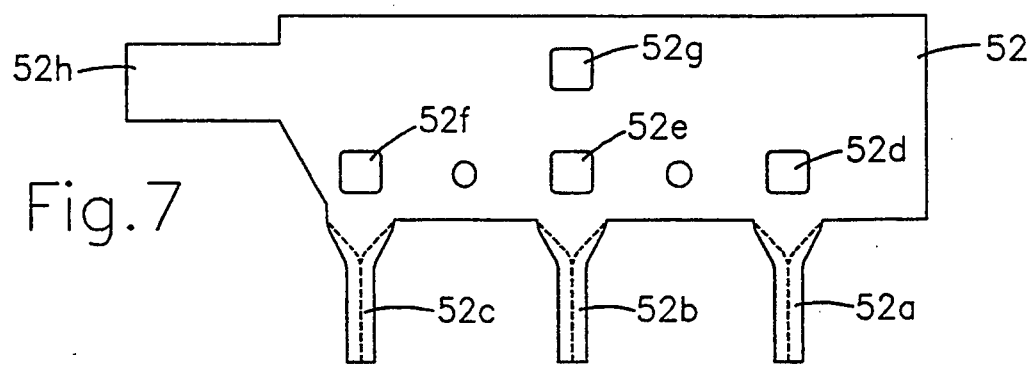
FIG. 7 is a plan view of one form of bus bar constructed in accordance with this invention.
Figure 8:
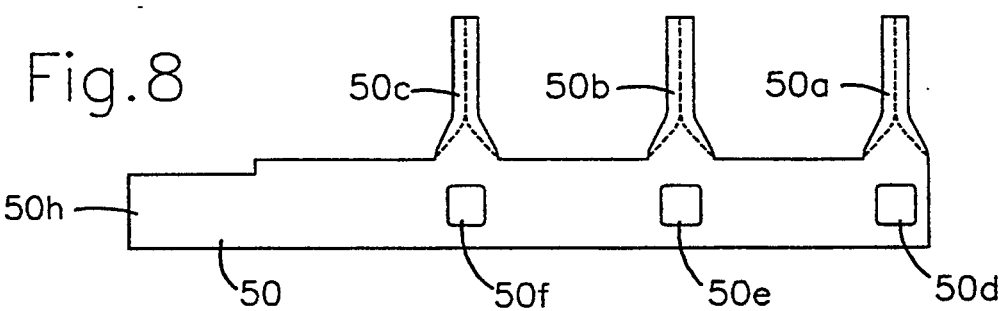
FIG. 8 is a plan view of a second form of bus bar constructed in accordance with this invention.

Bus bars used with the support panel 2 of this invention are shown in FIGS. 7 and 8. Referring first to FIG. 8, a bus bar 50 is shown comprising a generally planar elongated bar having a plurality of branch circuit connector fingers 50a, 50b and 50c projecting from one side thereof at substantially right angles thereto. The connector fingers 50a–50c have their opposite edges rolled upward and compressed together to form a connector terminal for receiving the jaws of a circuit breaker contact terminal. The structure of such a connector finger is shown and described in U.S. Pat. No. 3,611,048 issued Oct. 5, 1971 to B. S. Shelvik and assigned to the assignee of this application. The elongated bar portion of bus bar 50 is also provided with three substantially square holes 50d, 50e and 50f. Bus bar 52 shown in FIG. 7 is substantially similar to bus bar 50 except that the elongated bar portion is significantly wider than that of bar 50. The two bus bars 50 and 52 represent differently rated bus bars for handling different current amounts, e.g. bus bar 50 is rated at 125 amps whereas bus bar 52 is rated at 150–225 amps. Bus bars of the two different ratings are not intermixed on the same panel in use, but have been shown on the same panel in FIG. 9 only to illustrate the different mounting features of the support panel 2. Bus bar 52 has branch circuit connector fingers 52a, 52b and 52c projecting transversely from one side thereof at substantially right angles thereto. Note that the longitudinal displacement of fingers 52a, 52b and 52c is such that they align substantially intermediate the fingers 50a, 50b and 50c of bus bar 50. Bus bar 52 is also provided with three rectangular holes 52d, 52e and 52f arranged in a longitudinal row and spaced inwardly from the edge of the bus bar from which the connector fingers extend the same distance as do the holes 50d, 50e and 50f in bus bar 50. An additional hole 52g is provided in bus bar 52 in transverse alignment with hole 52e, but spaced therefrom. It is to be noted that the holes 50d, 50e and 50f and the holes 52d, 52e and 52f are longitudinally spaced along the length of the main body of the respective bus bars 50 and 52 to be in transverse alignment with the respective branch circuit connector fingers 50a, 50b, 50c and 52a, 52b, 52c. As viewed in FIGS. 7 and 8, the left-hand ends of the bus bars 50 and 52 are provided with reduced width tangs 50h and 52h, respectively, to receive a connector lug 54 thereon as shown in FIG. 9 and as shown in phantom in FIG. 1.

Figure 9:
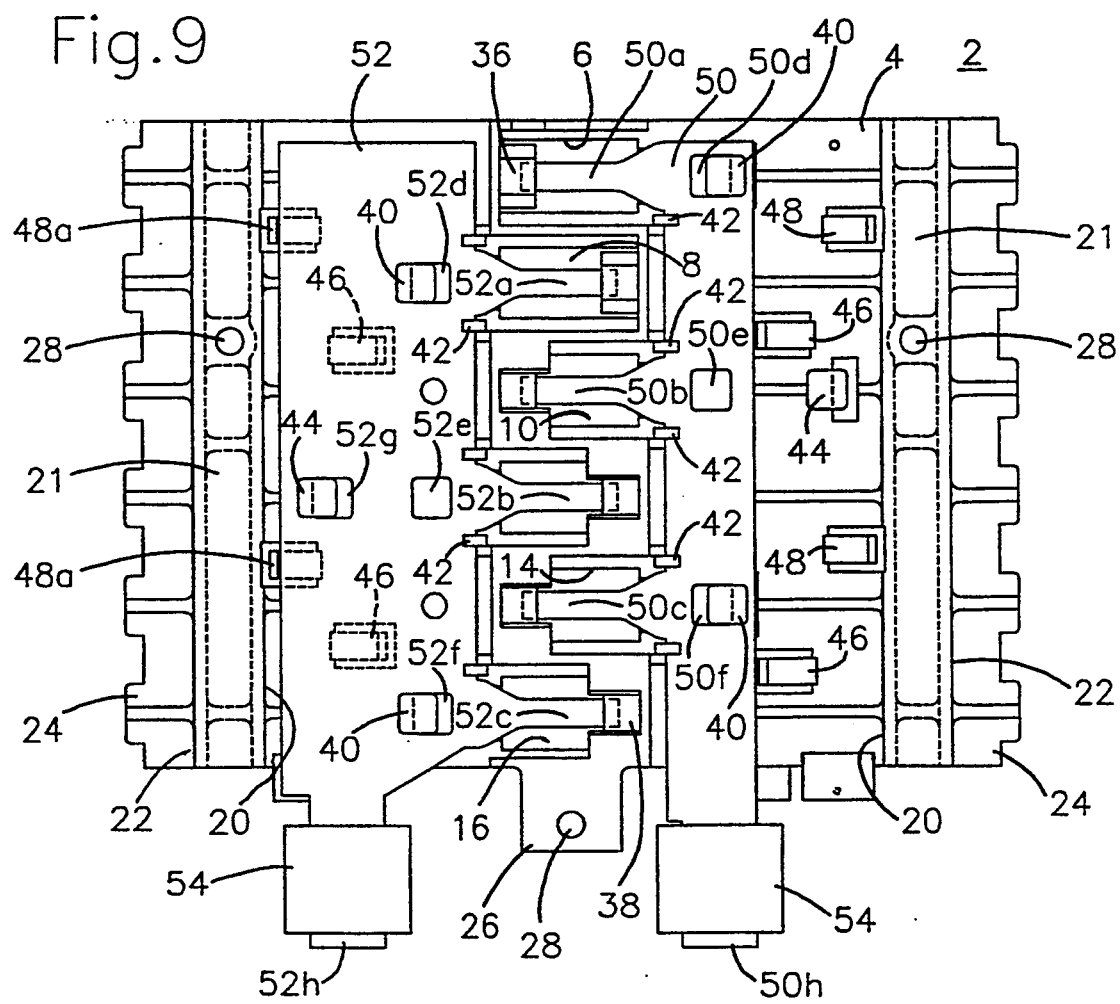
FIG. 9 is a rear plan view of the support panel as shown in FIG. 4 having the bus bars of FIG. 7 and FIG. 8 attached thereto.
Figure 10:
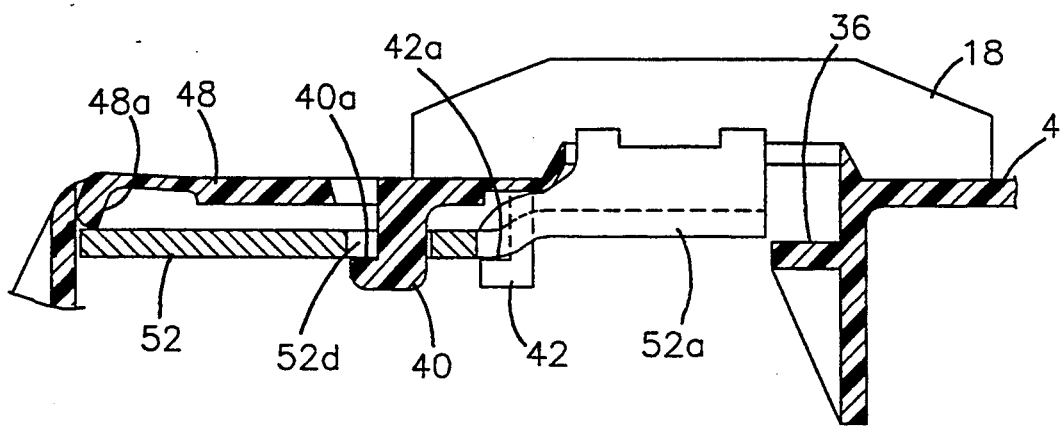
FIG. 10 is a fragmentary cross sectional view drawn to an enlarged scale illustrating a first step in attaching a bus bar to the support panel.
Figure 11:
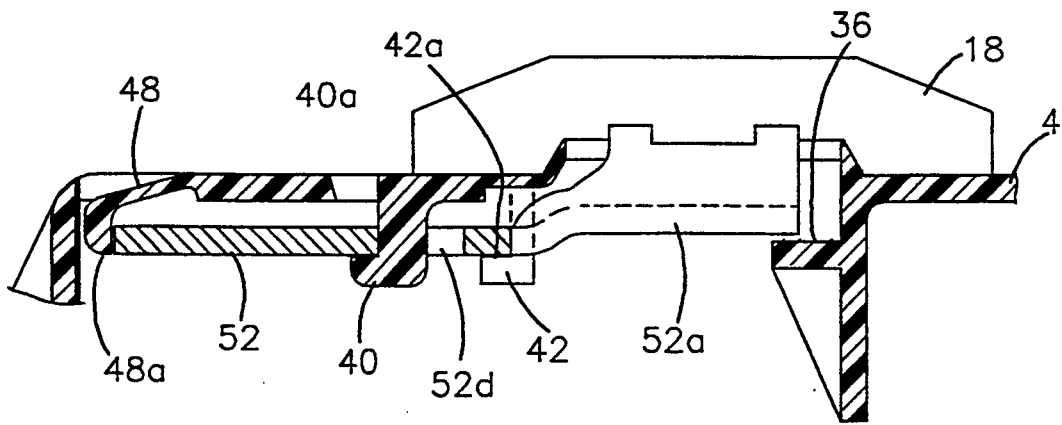
FIG. 11 is a fragmentary cross sectional view drawn to an enlarged scale similar to FIG. 10 showing a final step in attaching the bus bar to the support panel in accordance with this invention.

Referring to FIG. 9, 125 amp rated bus bar 50 is shown mounted to the support panel 2 at the right-hand side of the row of openings 6–16. The 150–225 amp bus bar 52 is shown mounted to the panel 2 at the left-hand side of the row of openings 6–16. Referring also to FIGS. 10 and 11, wherein the bus bar 52 is shown in sequential steps of attaching the bus bar to the support panel, the bus bars are positioned against the back side of the support panel 2 so that the respective holes 50d and 50f and 52d and 52f overlie the projections 40 and the respective branch circuit connector fingers 50a, 50b and 50c are disposed in alignment with the openings 6, 10 and 14, respectively, whereas the branch circuit connector fingers 52a, 52b, and 52c are disposed in alignment with the openings 8, 12 and 16. Also, with respect to bus bar 52, opening 52g is in alignment with and disposed over the projection 44. The respective bus bar is then pressed against the back side of the support panel 2, depressing latches 46, or 46 and 48, into the main body portion 4 of the support panel (see FIG. 10). With the bus bar pressed firmly against the back surface of the support panel 2, the back surface of the bus bar clears the forward facing shoulders 40a and 42a of projections 40 and 42 as well as the similar shoulder 44a on projection 44 permitting the bus bar to then be slid transversely toward the row of openings 6–16. In so doing, the distal end of the branch circuit connector fingers slides along the forward surface on the respective shelves 36 and 38 to support the distal end of the finger in the panel. The leading edge of the bus bar, i.e. that edge from which the respective branch circuit connector fingers extend, engages the shoulders 42a of projections 42 and an edge of the holes 50d, 50f and 52d, 52f, 52g engages the shoulders 40a and 44a to support the bus bar to the panel. As the bus bar is fully moved into engagement with the respective shoulders, the trailing edge, i.e. the edge opposite that from which the branch circuit connector fingers project, moves clear of the respective latch 46 or 48 such that the foot portion 46a, 48a springs rearwardly and engages the trailing edge of the bus bar to retain the bus bar in position. In the case of bus bar 50, the latches 46 engage the trailing edge whereas in the case of bus bar 52, the latches 48 engage the trailing edge while the latches 46 remain depressed by the main body portion of the bus bar. It will be appreciated that the bus bars 50 or 52 are made in cooperating right and left-hand pairs and are made in varying lengths according to the number of support panels 2 that are connected together. It can be seen that the bus bars easily and readily snap into place by finger pressure and that they are well supported by engagement of the forward facing shoulders of the projections 42 and 40, 44 as well as forward facing surface of the respective shelves 36, 38. The projection 44, engaging the bus bar at a greater lateral or transverse distance, broadens the support base to provide even greater support for the bus bar. It will be appreciated that with the bus bars so mounted, they are substantially protected by insulation from the front by the main body portion 4 of the support panel and from the sides by the side walls 20. The support panel 2 with bus bars 50 or 52 attached thereto may be mounted directly in an enclosure as a complete interior panel assembly, or the side walls 22 and flanges 24 may be omitted and the support panel 2 mounted to a pan (not shown) if so desired. Although the invention is shown in the best mode contemplated for carrying it out, it is to be understood that the invention is susceptible of various modifications without departing from the scope of the appended claims.

We claim:

1. An electrical load center interior panel comprising: a molded insulating support panel having a substantially planar main body portion, said support panel comprising:
   a front side;
   a back side;
   a row of spaced openings through said main body portion;
   a plurality of projections extending rearward from said back side, each of said projections comprising a forward-facing shoulder;
   a shelf within each of said spaced openings providing a forward-facing surface; and
   a plurality of resilient latches extending rearward from said back side; and
   a bus bar attached to said support panel at said back side, said bus bar comprising:
   an elongated bar having
   a plurality of longitudinally spaced holes therethrough and
   a plurality of longitudinally spaced connectors extending transversely from one side of said bar;
   said bus bar being attached to said support panel by aligning said holes with said projections and said connectors with respective ones of said openings, pressing said bar against said back side of said support panel to depress said latches into said main body portion, and sliding said bus bar laterally to an attached position whereat respective distal ends of said connectors engage said forward-facing surface of a respective said shelf and respective edges of said bus bar defining said holes engage said forward-facing shoulder of respective said projections, and said latches engage said bus bar, thereby blocking movement of said bus bar away from said attached position.

2. The electrical load center interior panel defined in claim 1 wherein individual ones of said projections are transversely aligned with a respective one of said openings, and individual ones of said holes in said elongated bar are transversely aligned with a respective one of said transversely extending connectors.

3. The electrical load center interior panel defined in claim 2 wherein there are fewer said projections than said openings.

4. The electrical load center interior panel defined in claim 2 wherein said support panel comprises a plurality of second projections extending rearward from said back side, each of said second projections comprising a forward-facing shoulder engaged by a lateral edge of said bus bar at said one side of said bus bar when said bus bar is at said attached position.

5. The electrical load center interior panel defined in claim 4 wherein a lateral edge of said bus bar at a side opposite said one side clears said latches when said bus bar is slid laterally to said attached position, said latches extending to engage said opposite side lateral edge, blocking movement of said bus bar away from said attached position.

6. The electrical load center interior panel defined in claim 5 wherein said latches comprise cantilevers defined by U-shaped slots in said main body portion, distal ends of said cantilevers having hook portions extending rearward out of a plane of said back side for engaging said opposite side lateral edges of said bus bar.

7. The electrical load center interior panel defined in claim 6 wherein said support panel comprises a mounting rail extending parallel to said row of spaced openings for mechanically anchoring one end of respective circuit breakers attached to said front side of said support panel.

8. The electrical load center interior panel defined in claim 2 wherein said bus bar comprises at least one auxiliary hole transversely aligned with a selected one of said holes in said elongated bar at selected transversely extending connector locations, and said support panel comprises a corresponding additional projection transversely spaced from a respective one of said projections to be received through said auxiliary hole and provide supporting engagement of said bus bar at different transverse distances from said openings.

9. The electrical load center interior panel defined in claim 8 wherein said support panel accepts bus bars of a selected one of two different transverse widths rated for different current carrying capacity, and said plurality of resilient latches comprise first and second groups of said resilient latches, a first group of said resilient latches engage a lateral edge of a bus bar having a first transverse width, maintaining said bus bar engaged with respective said shelves and said shoulders and blocking movement of said bus bar away from said attached position, and a second group of said resilient latches engage a lateral edge of a bus bar having a second transverse width wider than said first transverse width, maintaining said respective bus bar engaged with respective said shelves and shoulders and blocking movement of said bus bar away from said attached position.

10. The electrical load center interior panel defined in claim 9 wherein said bus bar having said second transverse width, in said attached position, maintains said first group of resilient latches depressed.

11. The electrical load center interior panel defined in claim 10 wherein distal ends of said connectors are disposed at substantially right angles to a major plane of said bus bar and said support panel main body portion.

12. The electrical load center interior panel defined in claim 11 wherein said distal ends of said connectors extend through respective said openings to said front side of said support panel.

13. The electrical load center interior panel defined in claim 2 wherein said molded insulating support panel comprises rearwardly extending side walls substantially parallel to said row of spaced openings, said side walls extending substantially rearward of a rear surface of said bus bar.

* * * * *